(12) United States Patent
Gerstenberger et al.

(10) Patent No.: US 11,104,224 B2
(45) Date of Patent: Aug. 31, 2021

(54) CLOSURE CAP FOR AN OPERATING MEDIUM TANK

(71) Applicant: Andreas Stihl AG & Co. KG, Waiblingen (DE)

(72) Inventors: Oliver Gerstenberger, Ditzingen (DE); Helmut Schlessmann, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 161 days.

(21) Appl. No.: 16/587,076

(22) Filed: Sep. 30, 2019

(65) Prior Publication Data

US 2020/0101839 A1 Apr. 2, 2020

(30) Foreign Application Priority Data

Oct. 1, 2018 (EP) ..................................... 18197946

(51) Int. Cl.
*B60K 15/05* (2006.01)
*B60K 15/04* (2006.01)

(52) U.S. Cl.
CPC .......... *B60K 15/05* (2013.01); *B60K 15/0409* (2013.01); *B60K 15/0406* (2013.01); *B60K 2015/0438* (2013.01); *B60K 2015/0451* (2013.01); *B60K 2015/0561* (2013.01)

(58) Field of Classification Search
CPC ................ B60K 15/05; B60K 15/0409; B60K 15/0406; B60K 15/0438; B60K 2015/0451; B60K 2015/0561
See application file for complete search history.

(56) References Cited

U.S. PATENT DOCUMENTS

| | | | |
|---|---|---|---|
| 3,831,801 A | 8/1974 | Rodgers | |
| 4,339,055 A * | 7/1982 | Hutzenlaub | ........ B60K 15/0406 220/295 |
| 4,376,492 A * | 3/1983 | Bartel | ................ B60K 15/0409 220/210 |
| 4,436,219 A * | 3/1984 | Reutter | .............. B60K 15/0406 220/295 |

(Continued)

FOREIGN PATENT DOCUMENTS

| | | |
|---|---|---|
| DE | 296 14 077 | 11/1996 |
| DE | 195 33 306 | 12/1996 |

(Continued)

*Primary Examiner* — Nicolas A Arnett
(74) *Attorney, Agent, or Firm* — Gudrun E. Huckett

(57) ABSTRACT

A closure cap for an operating medium tank is provided with a closure device projecting into a fill socket of the operating medium tank. The closure device has a first cap element, a second cap element, and a sealing ring arranged between the first and second cap elements. A lifting assembly axially moves by an axial travel the first and second cap elements relative to each other for opening and closing the fill socket. The lifting assembly has a pressure member acting axially on one of the first and second cap elements. A grip member is provided that is rotatable about a hub and actuates the lifting assembly. A cover disk covering at least partially the fill socket relative to an exterior is connected fixedly to the pressure member of the lifting assembly. The cover disk rotates, together with the pressure member, about the hub.

15 Claims, 7 Drawing Sheets

(56) References Cited

U.S. PATENT DOCUMENTS

| | | | | |
|---|---|---|---|---|
| 5,395,004 A * | 3/1995 | Griffin | ............... | B60K 15/0406 220/293 |
| 5,791,507 A * | 8/1998 | Harris | ................ | B60K 15/0406 220/203.26 |
| 5,829,620 A * | 11/1998 | Harris | ................ | B60K 15/0406 220/203.26 |
| 6,079,582 A | 6/2000 | Nickel et al. | | |
| 6,193,093 B1 | 2/2001 | Brunner | | |
| 6,213,331 B1 * | 4/2001 | Morgan | ............ | B60K 15/0406 220/295 |
| 6,755,316 B2 * | 6/2004 | Ono | ................... | B60K 15/0406 220/304 |
| 7,281,639 B2 * | 10/2007 | Yoshida | ............. | B60K 15/0406 220/288 |
| 7,484,636 B2 * | 2/2009 | Yoshida | ............. | B60K 15/0406 220/304 |
| 7,896,186 B2 | 3/2011 | Behnamrad et al. | | |
| 8,430,261 B2 * | 4/2013 | Eggenreich | ........ | B60K 15/0406 220/303 |
| 9,096,120 B2 * | 8/2015 | Jean | ....................... | B60K 15/00 |
| 9,527,380 B2 * | 12/2016 | Frank | ................ | B60K 15/0406 |
| 2004/0040619 A1 | 3/2004 | Dehn et al. | | |
| 2011/0240643 A1 * | 10/2011 | Ripberger, Jr. | .... | B60K 15/0406 220/212.5 |
| 2012/0248114 A1 | 10/2012 | Langemann | | |

FOREIGN PATENT DOCUMENTS

| | | |
|---|---|---|
| EP | 0 027 970 | 5/1981 |
| GB | 1 201 342 | 8/1970 |
| WO | 2012/156244 | 11/2012 |

\* cited by examiner

CLOSURE CAP FOR AN OPERATING MEDIUM TANK

BACKGROUND OF THE INVENTION

The invention relates to a closure cap for an operating medium tank, in particular for a fuel tank, comprising a closure device projecting into a fill socket of the operating medium tank. The closure device comprises a first cap element and a second cap element and further comprises a sealing ring arranged between the cap elements, wherein the cap elements for opening and closing the fill socket are axially movable relative to each other by an axial travel by means of a lifting assembly. Furthermore, a grip member rotatable about a hub is provided for actuating the lifting assembly, wherein the lifting assembly comprises a pressure member which acts axially on a cap element.

U.S. Pat. No. 6,079,582 discloses a closure cap of the aforementioned kind for a fill socket of a fuel tank. It comprises a closure device comprised of a base member as a first cap element and a second cap element that is axially slidably secured on the base member. Between the two cap elements, an O-ring is arranged which upon a relative travel between the cap elements is expanded in its diameter by a cone section of a cap element. In this way, the sealing ring sealingly contacts a sealing shoulder in the fill socket. The axial travel of the cap element is effected by a lifting assembly which is provided between the grip member of the closure cap and the second cap element facing it. By rotation of the grip member relative to the second cap element, a travel is performed which pushes the cone section of the second cap element into the sealing ring and expands the latter.

This closure cap which exhibits a high operational reliability works trouble-free; however, over the course of its service life, deposits can build up at the lifting assembly which may cause an increase in the operating force.

The invention has the object to further develop a closure cap for a fill socket of an operating medium tank in such a way that even over a long service life a substantially identical operating force for opening and closing the closure cap is provided.

SUMMARY OF THE INVENTION

In accordance with the invention, this is achieved in that the fill socket in outward direction is covered at least partially by a cover disk, in that the cover disk is connected fixedly to the pressure member of the lifting assembly, and in that the cover disk, together with the pressure member, is rotatable about the hub.

The fill socket is covered at least partially in outward direction by a cover disk. The cover disk overlaps the rim of the fill socket at least partially. The cover disk itself is fixedly connected to the pressure member of the lifting assembly so that the cover disk, together with the pressure member, is rotatable about the hub. The cover disk covers an intermediate space which accommodates the lifting assembly of the closure cap in outward direction for which purpose the cover disk at least partially projects across the rim of the fill socket. Since the lifting assembly is located within the fill socket and the cover disk covers the fill socket across at least 70% to 95%, the intermediate space with the lifting assembly is protected against dirt penetrating into it from the exterior. In this way, the operating force of the lifting assembly can be substantially maintained at the same level even for an extended operating duration.

Advantageously, the cover disk is positioned above the outer rim of the fill socket. Viewed in axial direction onto the fill socket, the cover disk and the rim of the fill socket overlap each other.

The cover disk can be configured as a separate component which is secured fixedly on the pressure member. In particular, the cover disk is embodied unitarily as one piece with the pressure member of the lifting assembly.

In a further embodiment of the invention, the cover disk comprises an outer diameter that preferably matches the outer diameter of the rim of the fill socket. The arrangement is configured such that the cover disk in circumferential direction at least partially projects across the outer rim of the fill socket. In this way, the cover disk substantially completely covers the outer rim of the fill socket. It can be expedient when the outer diameter of the cover disk is larger than the outer diameter of the rim of the fill socket, for example, larger by 2% to 5%. The cover disk projects in particular past the outer rim of the fill socket.

Expediently, the disk rim of the cover disk in cross section is embodied Z-shaped. The disk rim of the cover disk comprises across at least a portion of the circumference a circumferential wall with an axial height. The circumferential wall projects in particular perpendicularly to the plane of the cover disk. The upper rim of the circumferential wall supports a radial flange which projects past the outer rim of the fill socket.

In a secured closed position of the closure cap in the fill socket, the circumferential wall projects across a partial height into the fill socket. The arrangement is selected such that between the disk rim of the cover disk and the fill socket a gap seal is formed. Advantageously, the gap seal extends across a peripheral angle of at least 180°, preferably a peripheral angle of 270°, in particular a peripheral angle of 320°.

Further features of the invention result from the additional claims, the description, and the drawing in which features of an embodiment of the invention described in detail in the following are illustrated. The illustrated and described features can be combined with each other in any combination.

DESCRIPTION OF PREFERRED EMBODIMENTS

Figure 1:
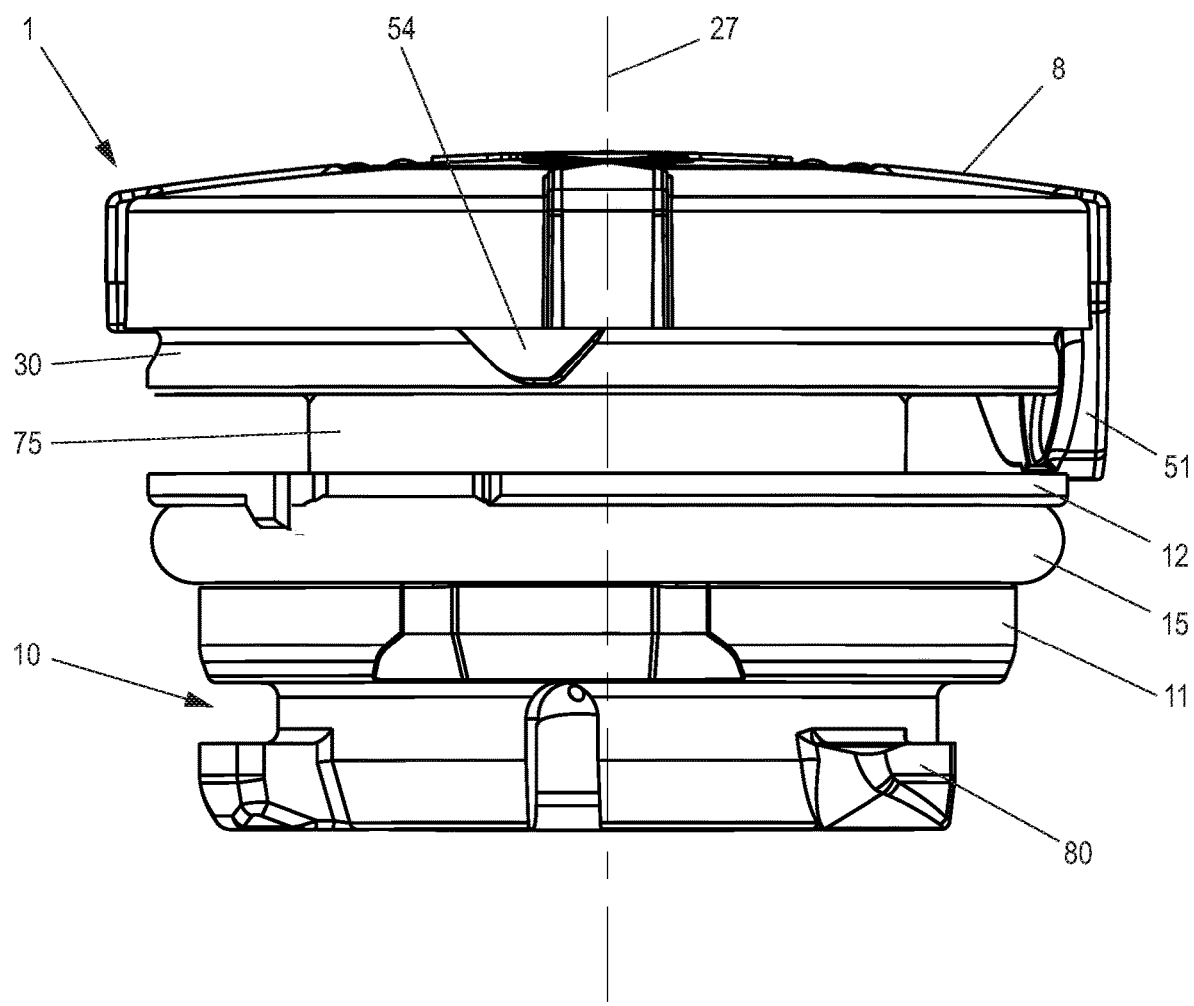
FIG. 1 shows a closure cap according to the invention in a side view.
Figure 2:
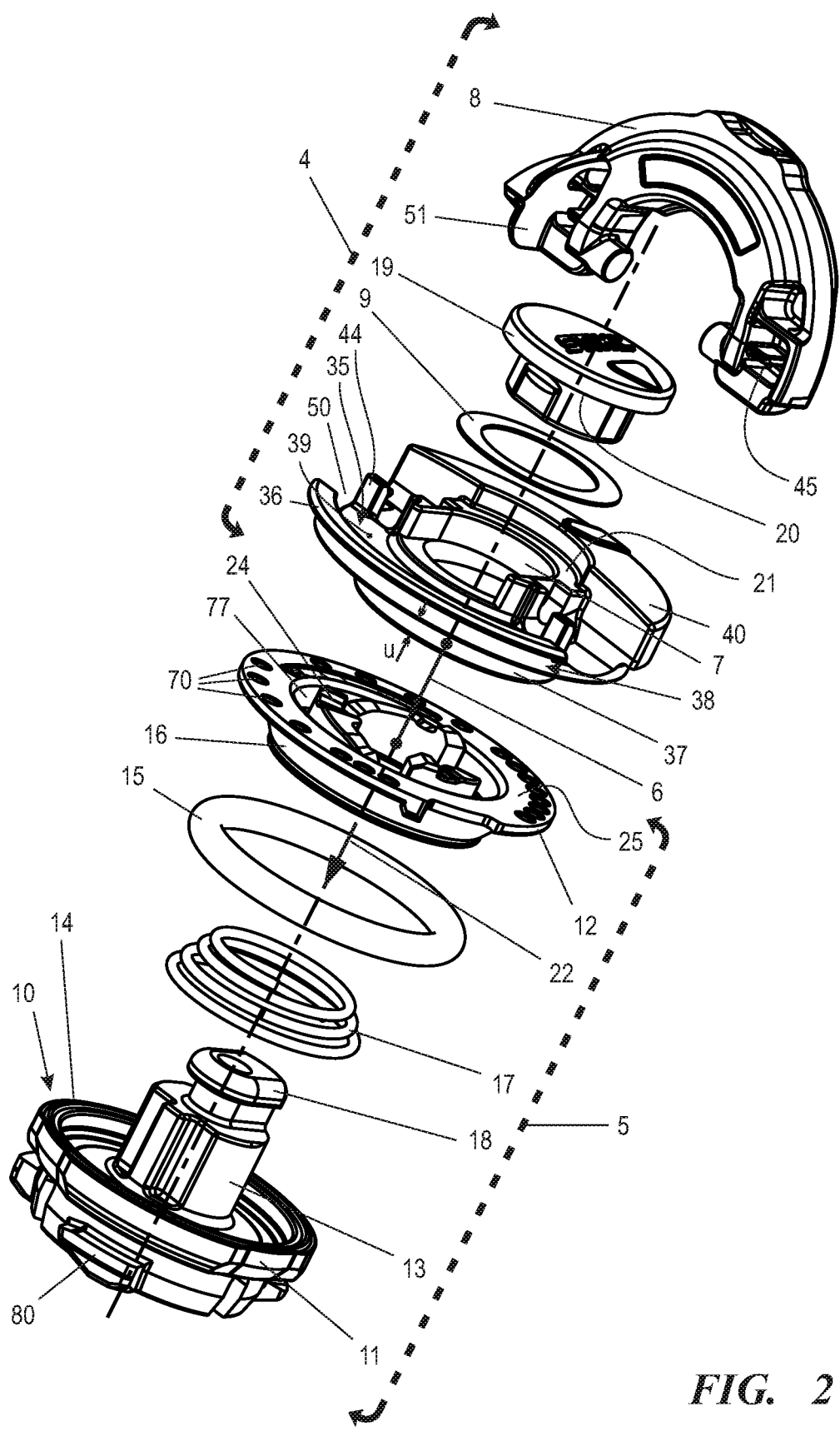
FIG. 2 shows an exploded view of the individual components of the closure cap according to the invention as shown in FIG. 1.

FIG. 1 shows a closure cap 1 for a fill socket 2 (FIG. 3) of an operating medium tank 3 in a side view. The closure cap 1 is represented with its individual components in the exploded illustration according to FIG. 2.

The closure cap 1 comprises a base member 10 with a central mounting stud 13; the additional components of the closure cap 1 are secured by the mounting stud 13.

Figure 3:
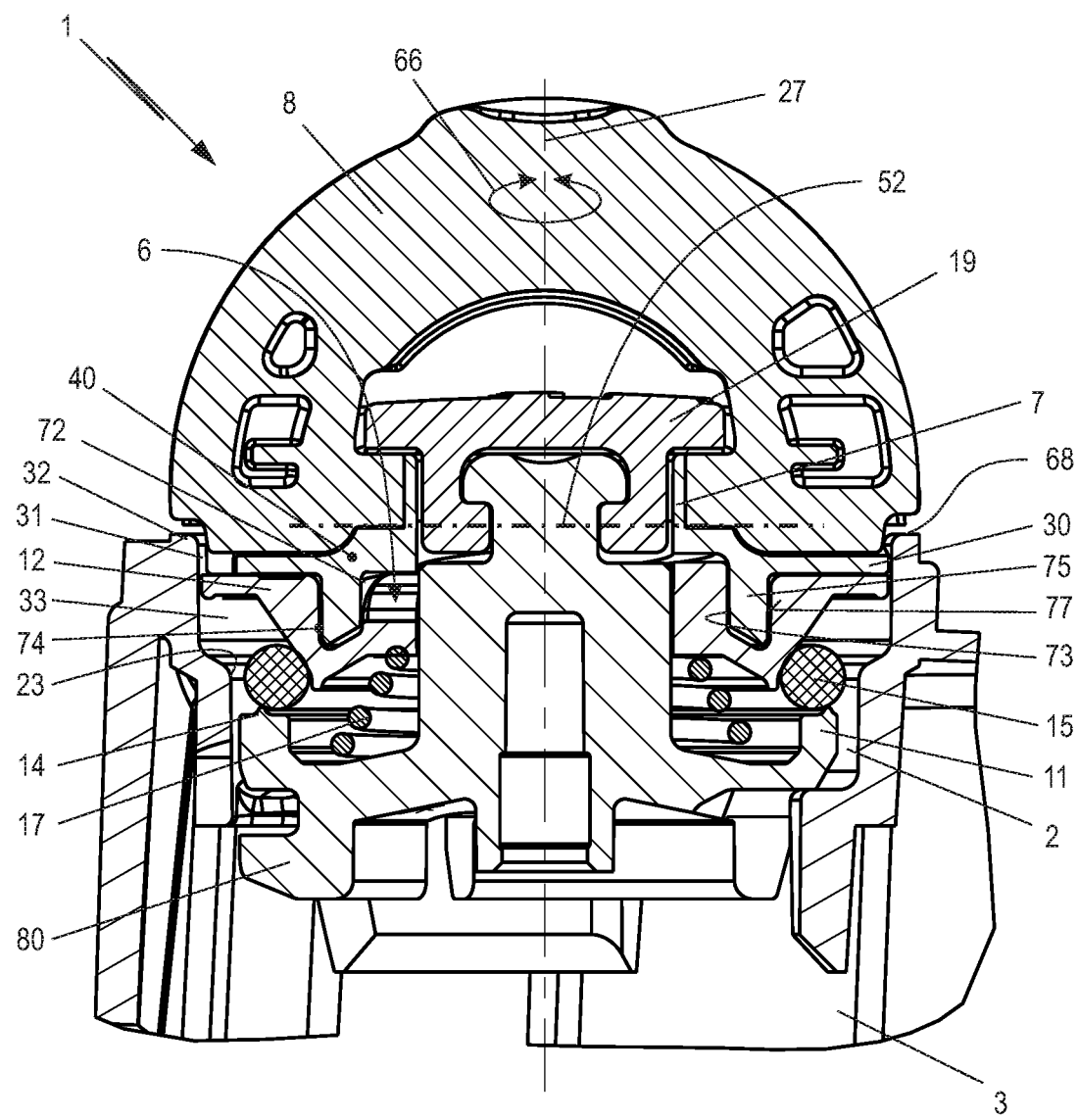
FIG. 3 is a schematic section view of a fill socket of an operating medium tank with a closure cap inserted therein in open position.

The base member 10 forms a first cap element 11; a second cap element 12 is arranged on the mounting stud 13 so as to be slidable in axial direction. The first cap element 11 comprises a support ring 14 for a sealing ring 15 which is designed as an O-ring in the embodiment. The second cap element 12 comprises a cone section 16 that, in the mounted state of the closure cap 1, projects into the sealing ring 15 (FIG. 3). A lifting spring 17 is acting between the first cap element 11 and the second cap element 12 and, in the embodiment, is designed as a conical spiral spring.

At its free end, the mounting stud 13 comprises a mounting head 18 for a holding member 19.

The closure cap 1 comprises moreover a grip member 4 which is substantially comprised of a pressure member 40 with a hub 7 and a grip lever 8 fixedly connected to the hub 7 and to the pressure m ember 40. The pressure member 40 is threaded with the hub 7 onto the mounting stud 13 and the holding member 19 is pushed onto the mounting head 18 for securing. The grip member 4 is thus captively secured on the base member 10 and is rotatable about a certain angle.

For securing, the holding member 19 engages by means of a rim 20 across a support rim 21 of the pressure member 40. An intermediate disk 9 is arranged between the projecting rim 20 and the support rim 21 for easy rotary movability.

The cap elements 11 and 12 form together with the sealing ring 15 and the lifting spring 17 a closure device 5. The closure device 5 can be actuated by the grip member 4. For closing the closure device 5, the second cap element 12 carries out an axial travel H (FIG. 4) in the direction of arrow 22 (FIG. 2) causing the conical section 16 to dip into the sealing ring 15 and to radially expand the sealing ring 15 until the latter contacts a sealing rim 23 (FIG. 3) of the fill socket 2. For carrying out the axial travel H in the direction of arrow 22, a lifting assembly 6 is provided which is arranged between the second cap element 12 and the hub 7 of the pressure member 40 in the illustrated embodiment.

The lifting assembly 6 is comprised substantially of a cam track 24 which is arranged on the end face 25 of the second cap element 12 facing the hub 7 in the illustrated embodiment. The cam track 24 interacts with a cam, not illustrated in detail, which is provided at the hub 7.

A cover disk 30 is provided at the hub 7 and its position and function can be taken from the illustrations of FIGS. 3 to 6. The cover disk 30 protects the fill socket 2 against penetration of dirt. In a broader sense, the cover disk 30 seals the fill socket 2 relative to the exterior.

Figure 4:
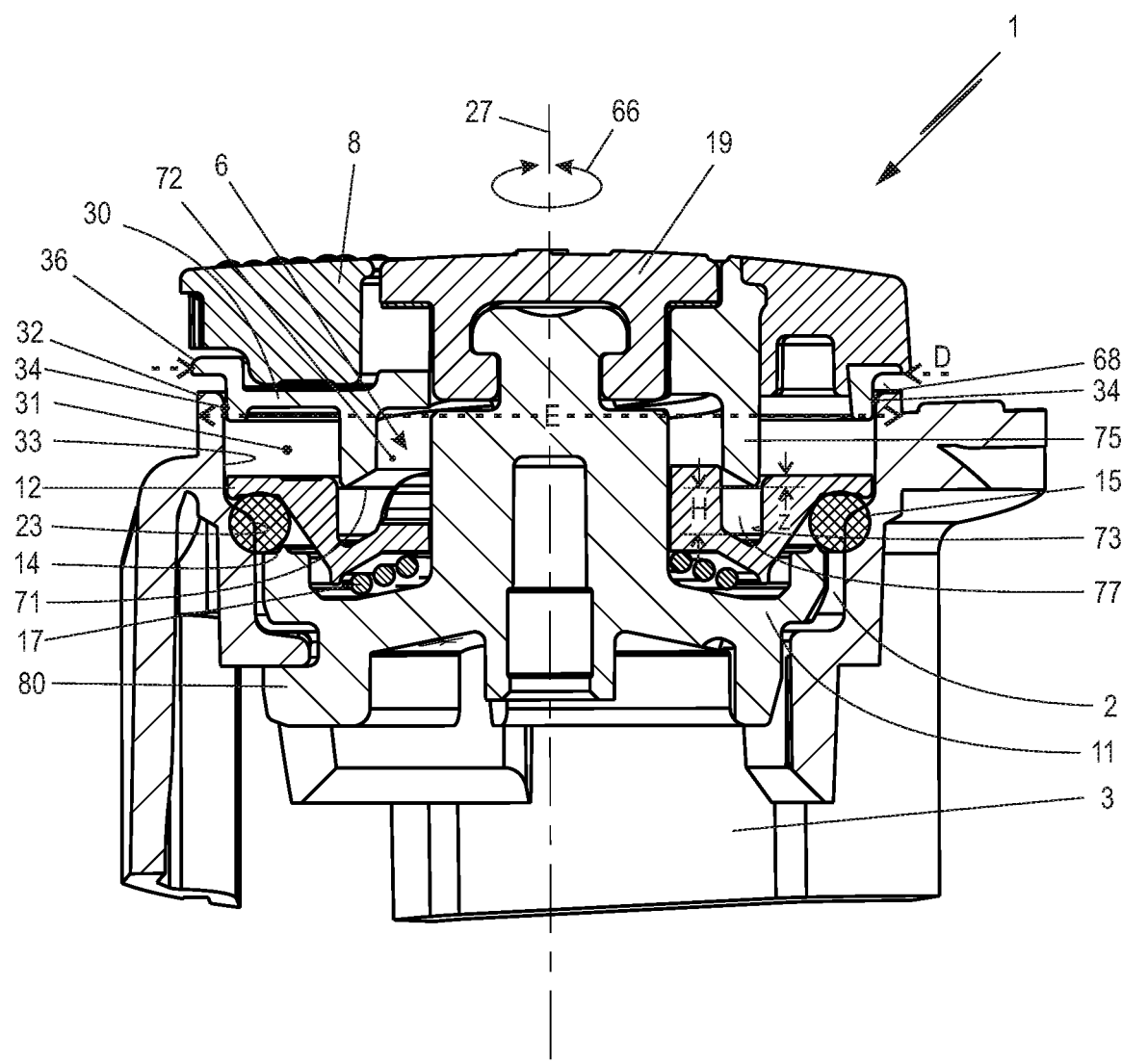
FIG. 4 is a schematic section view of a fill socket of an operating medium tank according to FIG. 3 with a closure cap inserted therein in closed position.

As can be seen in particular in FIG. 4, the disk rim 36 of the cover disk 30 overlaps radially the outer rim 32 of the fill socket 2 at least partially. Expediently, the cover disk 30 has an outer diameter D which advantageously matches the outer diameter E of the fill socket 2. The disk rim 36 ends at the outer edge of the rim 32 of the fill socket 2. The outer diameter E of the fill socket 2 corresponds to the outer diameter E of the rim 32 of the fill socket 2. The annular area 68 (FIG. 1) of the rim 32 of the fill socket 2 is covered in circumferential direction of the rim 32 by the cover disk 30 across more than 189°, preferably more than 270°, in particular more than 330°.

The lifting assembly 6 is located in an intermediate space 31 (FIGS. 3, 4) of the closure cap 1. This intermediate space 31 is delimited in radial direction, on the one hand, by the mounting stud 13 and, on the other hand, by the fill socket 2. Axially, the intermediate space 31 is delimited by the second cap element 12 of the closure device 5 and the cover disk 30 provided at the hub 7. The cover disk 30, which is spatially arranged between the second cap element 12 and the grip member 4 and at least partially projects across the rim 32 of the fill socket 2, forms thus an exterior seal. The cover disk 30 which overlaps the rim 32 of the fill socket 2 seals, on the one hand, the intermediate space 31 relative to the environment and seals, on the other hand, the opening 33 of the fill socket 2 relative to the environment at the same time.

Figure 5:
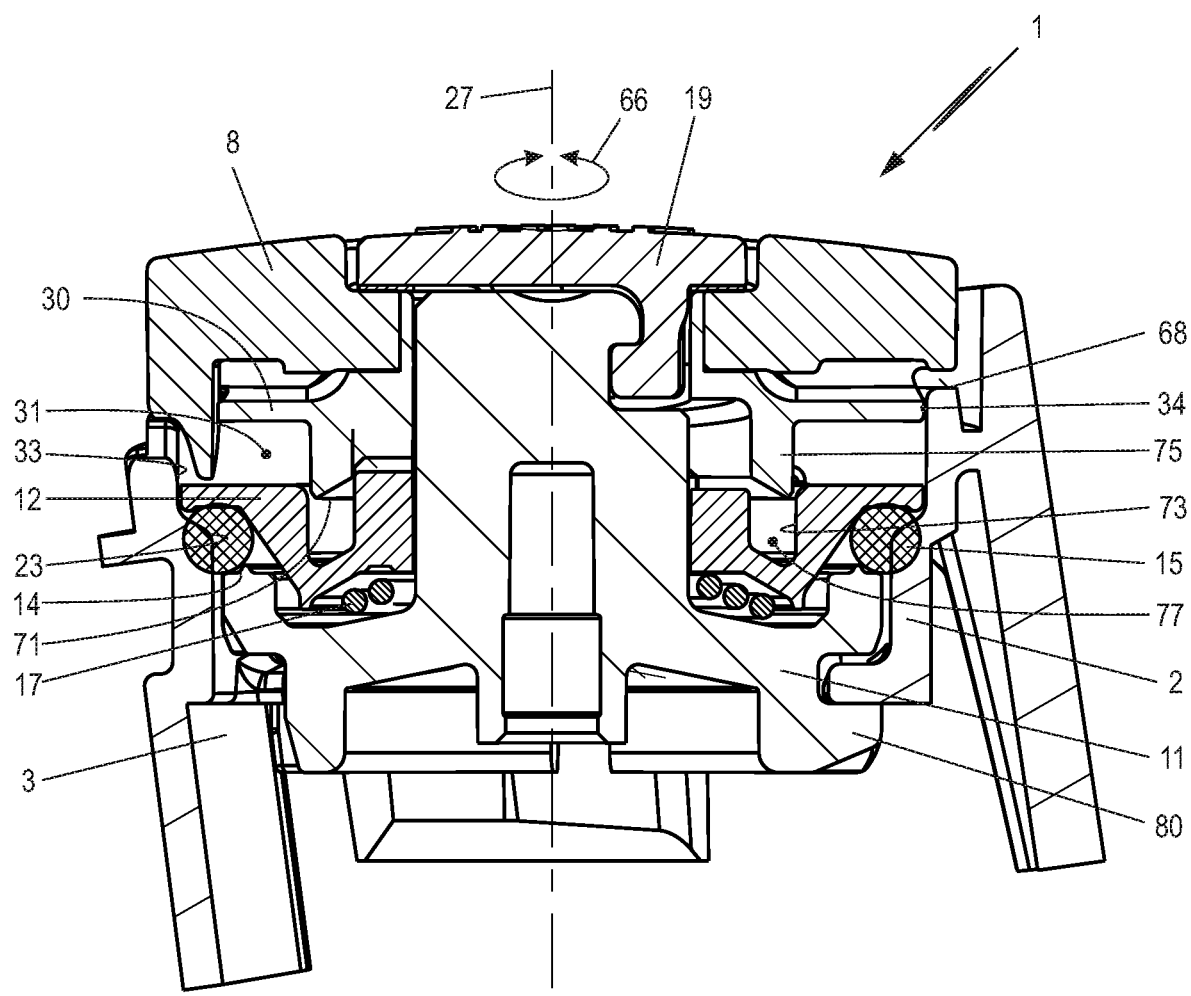
FIG. 5 shows a rotated schematic section view of a closure cap in closed position according to FIG. 4.
Figure 7:
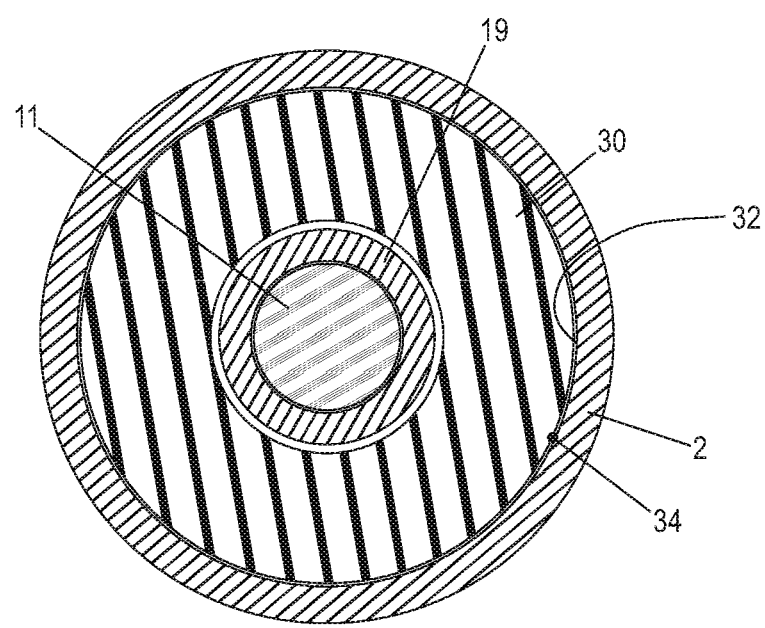
FIG. 7 is a schematic section view of a closure cap in closed position according to FIG. 4.

As can be seen in the section illustrations of FIGS. 3 to 5, the cover disk 30 is fixedly secured on the hub 7 of the pressure member 40 of the grip member 4. The cover disk 30 can be a separate component that is fastened to the hub 7. Advantageously, the cover disk 30 and the hub 7 are of a unitary one-piece configuration. The cover disk 30 forms a gap seal 34 (FIG. 4) together with the rim 32 of the fill socket 2. The gap seal 34 extends across a peripheral angle of at least 180°, preferably a peripheral angle of 270°, in particular a peripheral angle of 320° (FIG. 7). As can be seen in the section illustrations of FIGS. 3 to 5 as well as the exploded illustration according to FIG. 2, the cover disk 30 is configured as a partial ring plate 35 with a raised circumferential rim 38. The circumferential rim 38 extends on the side 39 of the cover disk 30 which is facing the grip lever 8. The raised circumferential rim 38 extends at least about a portion of the circumference of the cover disk 30. The circumferential rim 38 of the cover disk 30 comprises a circumferential wall 37 with a height u which, in the closed position of the closure cap 1, is positioned at least across a partial heig ht within the fill socket 2.

In the circumferential rim 38 of the cover disk 30—in the region of its outer diameter D—at least one cutout 50 is formed. The cutout 50 has associated therewith a correspondingly designed receptacle provided in the rim 32 of the fill socket 2. The receptacle serves for engaging a securing cam 51 (FIG. 1) which is arranged at the grip lever 8. In the actuating position of the grip lever 8 illustrated in FIG. 3, the latter is pivoted upwardly by 90° about a pivot axis 52 of the grip member 4. In doing so, the securing cam 51 exits from the receptacle in the rim 32 of the fill socket 2 and enables rotation of the grip member 4—also together with the base member 10—about an axis of rotation 27 (FIG. 1) of the grip member 4.

For opening the closure cap 1, the grip lever 8 is pivoted upwardly about a 90° angle from the horizontal position according to FIGS. 4 and 5 into a vertical position according to FIG. 3. In doing so, the securing cam 51 disengages from the receptacle at the fill socket 2 so that a rotation of the grip member 4 relative to the base member 10 is possible. In order to be able to turn the grip member 4, a pressure element 54 (FIG. 6) provided at the pressure member 40 must be rotated out of a locking recess 55 in the rim 32 of the fill socket 2, for which purpose the locking recess 55 comprises a leading flank 57 with minimal gradient in the rotational opening direction.

Figure 6:
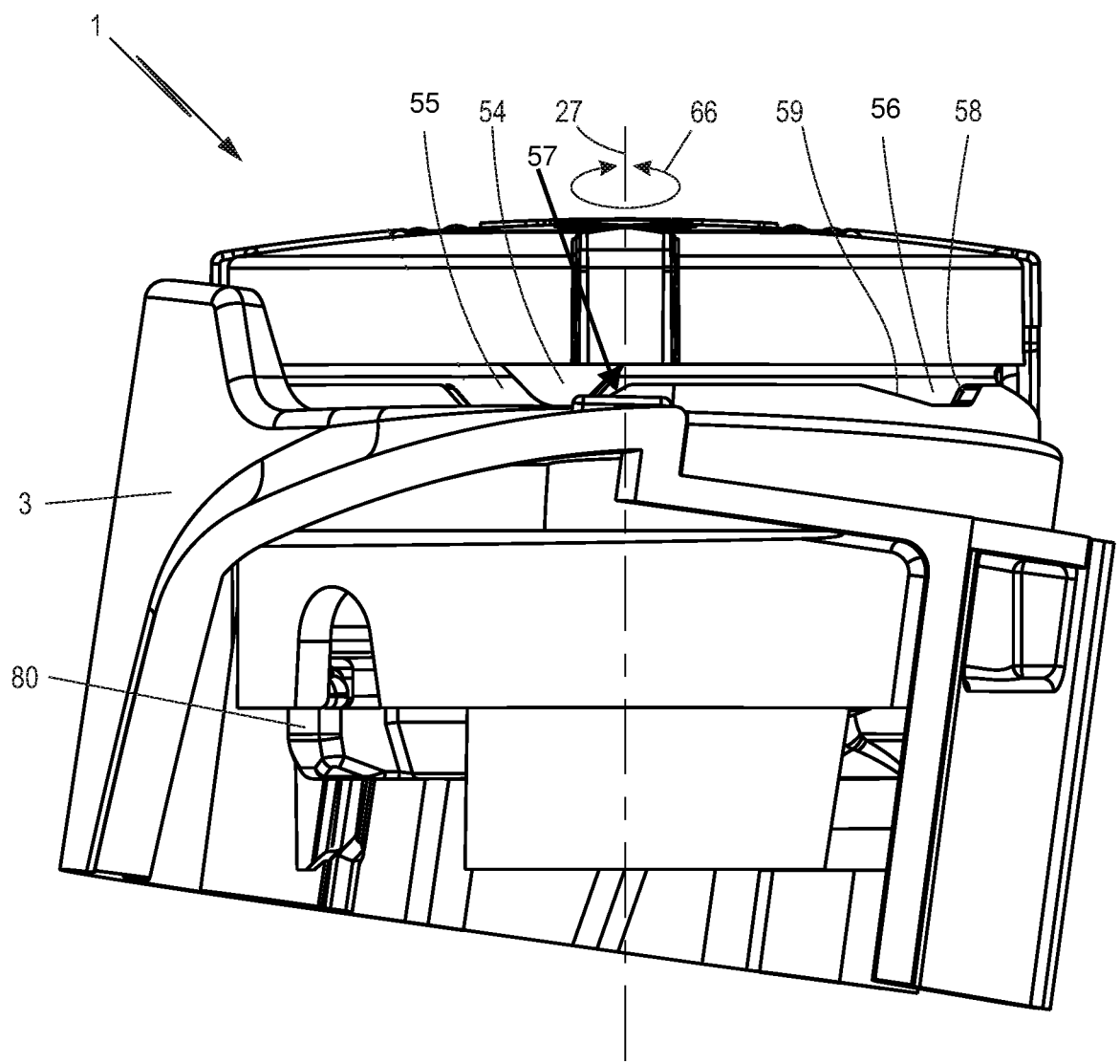
FIG. 6 is a side view of a fill socket of an operating medium tank closed by a closure cap according to the invention.

Upon further rotation about the axis of rotation 27 into an open position according to the direction of arrow 66 in FIG. 6, the pressure element 54 along its rotational path into the open position moves into the second locking recess 56 positioned at a rotational spacing relative to the first locking recess 55. The locking recess 56 has a steep side 58 in rotational direction so that the pressure element 54 impacts—noticeable to the operator—against the steep side 58 and the further opening movement is impaired. This provides the possibility that excess pressure in the operating medium tank 3 can be vented prior to the closure cap 1 being opened completely.

In order to be able to provide for pressure release during opening of the closure cap 1, the upper second cap element 12 has through openings 70. The through openings 70 open into the intermediate space 31.

As shown e.g. in FIGS. 3 to 5, the upper second cap element 12 has an annular groove 77 that surrounds the cam track 24 of the lifting assembly 6. The cam track 24 is thus positioned—as can be seen also in FIG. 3—within the space which is delimited by the annular groove 77.

The hub 7 of the pressure member 40 of the grip member 4 which is facing the cap element 12 comprises as an axial extension a cylindrical circumferential wall 75 which is configured for engagement of the annular groove 77. In the annular area of the hub 7 which is surrounded by the circumferential wall 75, the cams of the pressure member 4 are located which interact with the cam track 24 of the second cap element 12 and are part of the lifting assembly 6.

In the open position according to FIG. 3, the circumferential wall 75 is immersed axially completely in the annular groove 77. The circumferential wall 75 is accommodated in the annular groove 77. In the closed position according to FIGS. 4 and 5, the circumferential wall 75 is moved out of the annular groove 77 with the exception of a residual travel. In the open position according to FIGS. 4 and 5, an overlap length z is provided between the groove wall 73 and the end 71 of the circumferential wall 75. In the closed position according to FIGS. 4 and 5 and also in the open position according to FIG. 3, a gap seal is thus provided which protects the lifting assembly 6 against penetration of dirt.

In the illustrated embodiment, the lifting assembly 6 is positioned in the intermediate space 31 between the second cap element 12 and the pressure member 40. The gap seal 74 seals a cam space 72 which forms a part of the intermediate space 31. The cam space 72 is thus protected, on the one hand, by the gap seal 74 and, on the other hand, by the cover disk 30 against penetration of dirt.

For closing the fill socket 2 of an operating medium tank 3, the closure cap 1 in open position of the closure device 5 is inserted into the fill socket 2. By pins provided in the fill socket 2, the base member 10 can be axially inserted only in an aligned rotational position into the fill socket 2.

The rotational position required for insertion of the closure cap 1 is visually recognizable by a marking on the cover disk 30.

When the closure cap 1 is lowered into the fill socket 2, the grip member 4 with the grip lever 8 is rotated about the axis of rotation 27 in closing direction wherein closure elements 80 of the base member 10 interact with projections in the fill socket 2, not illustrated. When the base member 10 is in a rotationally fixed end position, the grip member 4 is rotated relative to the base member 10 so that the cams of the pressure member 40 glide on the cam tracks 24 of the second cap element 12 facing the pressure member 40. In this way, the second cap element 12 moves in the direction of arrow 22 by an axial travel H so that the cone section 16 of the cap element 12 dips into the sealing ring 15. In this way, the sealing ring 15 is radially expanded and contacts the sealing rim 23 in the fill socket 2. Upon further rotation about the axis of rotation 27 in closing direction, the pressure element 54 first reaches the locking recess 56 in the rim 32 of the fill socket 2. This locking recess 56 has a flank 59 with low gradient in closing direction so that the operator can easily continue to rotate the closure cap 1 in closing direction. The pressure element 54 continues to glide until it locks in the locking recess 55 so that the end position of the rotary position in the closing direction is reached. The securing cam 51 can now be moved into the receptacle in the rim 32 of the fill socket 2 upon folding of the grip lever 8 into the horizontal position. The operating medium container 3 is seal-tightly closed.

The second cap element 12 is secured rotationally fixed relative to the base member 10, i.e., to the first cap element 11, so that upon relative rotation of the grip member 4 relative to the base member 10 the cam of the pressure member 40 can glide onto the cam track 24.

In a further embodiment of the invention, it is furthermore provided that the cover disk 30 comprises at least one locking nose 44 which locks the pivotable grip lever 8 in closed position. The locking nose 44 extends in open position of the grip lever 8 parallel to the grip lever 8. The locking nose 44 is positioned perpendicularly to the plane of the cover disk 30. The locking nose 44 engages a locking recess 45 in the grip lever 8. The locking nose 44 secures, on the one hand, the open position of the grip lever 8 illustrated in FIG. 3 and, on the other hand, the closed position of the grip lever 8 illustrated in FIG. 4.

The specification incorporates by reference the entire disclosure of European priority document 18 197 946.9 having a filing date of Oct. 1 , 2018.

While specific embodiments of the invention have been shown and described in detail to illustrate the inventive principles, it will be understood that the invention may be embodied otherwise without departing from such principles.

What is claimed is:

1. A closure cap for an operating medium tank, the closure cap comprising:
   a closure device projecting into a fill socket of the operating medium tank, the closure device comprising a first cap element, a second cap element, and a sealing ring arranged between the first cap element and the second cap element;
   a lifting assembly configured to axially move by an axial travel the first cap element and the second cap element relative to each other for opening and closing the fill socket, wherein the lifting assembly comprises a pressure member acting axially on one of the first and second cap elements;
   a grip member rotatable about a hub and configured to actuate the lifting assembly;
   a cover disk covering at least partially the fill socket relative to an exterior, wherein the cover disk is connected fixedly to the pressure member of the lifting assembly, and wherein the cover disk is configured to rotate, together with the pressure member, about the hub.

2. The closure cap according to claim 1, wherein the cover disk is arranged above an outer rim of the fill socket.

3. The closure cap according to claim 1, wherein the cover disk and the pressure member of the lifting assembly are embodied together as one piece.

4. The closure cap according to claim 1, wherein the cover disk has an outer diameter that matches an outer diameter of an outer rim of the fill socket.

5. The closure cap according to claim 1, wherein the cover disk is at least partially projecting past the outer rim of the fill socket.

6. The closure cap according to claim 1, wherein the cover disk comprises a disk rim that is Z-shaped in cross section.

7. The closure cap according to claim 1, wherein the cover disk comprises a disk rim and the disk rim comprises, across at least a portion of a circumference of the disk rim, a circumferential wall with an axial height.

8. The closure cap according to claim 7, wherein, in a closed position of the closure cap, the circumferential wall projects with a portion of the axial height into the fill socket.

9. The closure cap according to claim 7, wherein a gap seal is formed between the cover disk and the fill socket.

10. The closure cap according to claim 9, wherein the gap seal extends about a peripheral angle of at least 180°.

11. The closure cap according to claim 10, wherein the peripheral angle is 270°.

12. The closure cap according to claim 10, wherein the peripheral angle is 320°.

13. The closure cap according to claim 1, wherein the cover disk comprises at least one locking nose configured to lock a grip lever of the grip member in a closed position.

14. The closure cap according to claim 13, wherein the locking nose extends parallel to the grip lever in an open position of the grip lever.

15. The closure cap according to claim 13, wherein the locking nose, in the closed position of the grip lever, engages a locking recess provided in the grip lever.

\* \* \* \* \*